United States Patent
Chemisky et al.

(10) Patent No.: US 8,825,422 B2
(45) Date of Patent: Sep. 2, 2014

(54) FIELD DEVICE FOR PROCESS INSTRUMENTATION

(75) Inventors: Eric Chemisky, Soultz sous foretz (FR); Michael Geppert, Ottersweier (DE); Ulrich Hahn, Lebach (DE); Simon Rohrbach, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 620 days.

(21) Appl. No.: 12/747,489

(22) PCT Filed: Dec. 12, 2008

(86) PCT No.: PCT/EP2008/067451
§ 371 (c)(1),
(2), (4) Date: Aug. 17, 2010

(87) PCT Pub. No.: WO2009/074681
PCT Pub. Date: Jun. 18, 2009

(65) Prior Publication Data
US 2010/0305896 A1  Dec. 2, 2010

(30) Foreign Application Priority Data
Dec. 12, 2007 (DE) .......................... 10 2007 059 847

(51) Int. Cl.
*G01D 18/00* (2006.01)
*G05B 23/02* (2006.01)

(52) U.S. Cl.
CPC .................................. *G05B 23/0235* (2013.01)
USPC .......................................................... 702/85

(58) Field of Classification Search
CPC .............................. G01D 3/036; G05B 23/0235
USPC ............................................................... 702/85
See application file for complete search history.

(56) References Cited

U.S. PATENT DOCUMENTS 3,675,050 A * 7/1972 Paul .............................. 327/590
4,783,659 A   11/1988 Frick
6,445,962 B1 * 9/2002 Blevins et al. .................. 700/37
(Continued)

FOREIGN PATENT DOCUMENTS

DE   199 30 661   1/2001
DE   101 46 949   6/2002
(Continued)

OTHER PUBLICATIONS

Parlos, Alexander, Lecture 10B: The Classical Three-Term PID Controller, http://http://parlos.tamu.edu/MEEN651/Lecture10B.pdf, Fall 2003, Last Accessed Oct. 21, 2013.*

*Primary Examiner* — John Breene
*Assistant Examiner* — Timothy H Hwang
(74) *Attorney, Agent, or Firm* — Cozen O'Connor

(57) ABSTRACT

A field device for process instrumentation, in particular a measuring transducer, comprising an analogue output to which a two-wire line is connectable for transmitting an analogue output signal. The output circuit contains a controller with an actuator connected downstream for the analogue output signal. A monitoring unit monitors whether an actuating signal remains within a predeterminable value range to monitor the output circuit for correctly setting the loop current. If the actuating signal is outside the value range, an indicator signal is output to a computing unit so that suitable measures can be introduced in response to an error state that has thus been identified.

3 Claims, 1 Drawing Sheet

(56) References Cited

U.S. PATENT DOCUMENTS

| | | |
|---|---|---|
| 6,546,295 B1 * | 4/2003 | Pyotsia et al. .................. 700/37 |
| 2002/0082799 A1 * | 6/2002 | Pramanik ...................... 702/130 |
| 2004/0024572 A1 * | 2/2004 | Pagnano et al. ............... 702/188 |

FOREIGN PATENT DOCUMENTS

| | | |
|---|---|---|
| EP | 0 456 168 | 11/1991 |
| EP | 1 192 614 | 4/2002 |
| WO | WO 01/03098 | 1/2001 |

* cited by examiner

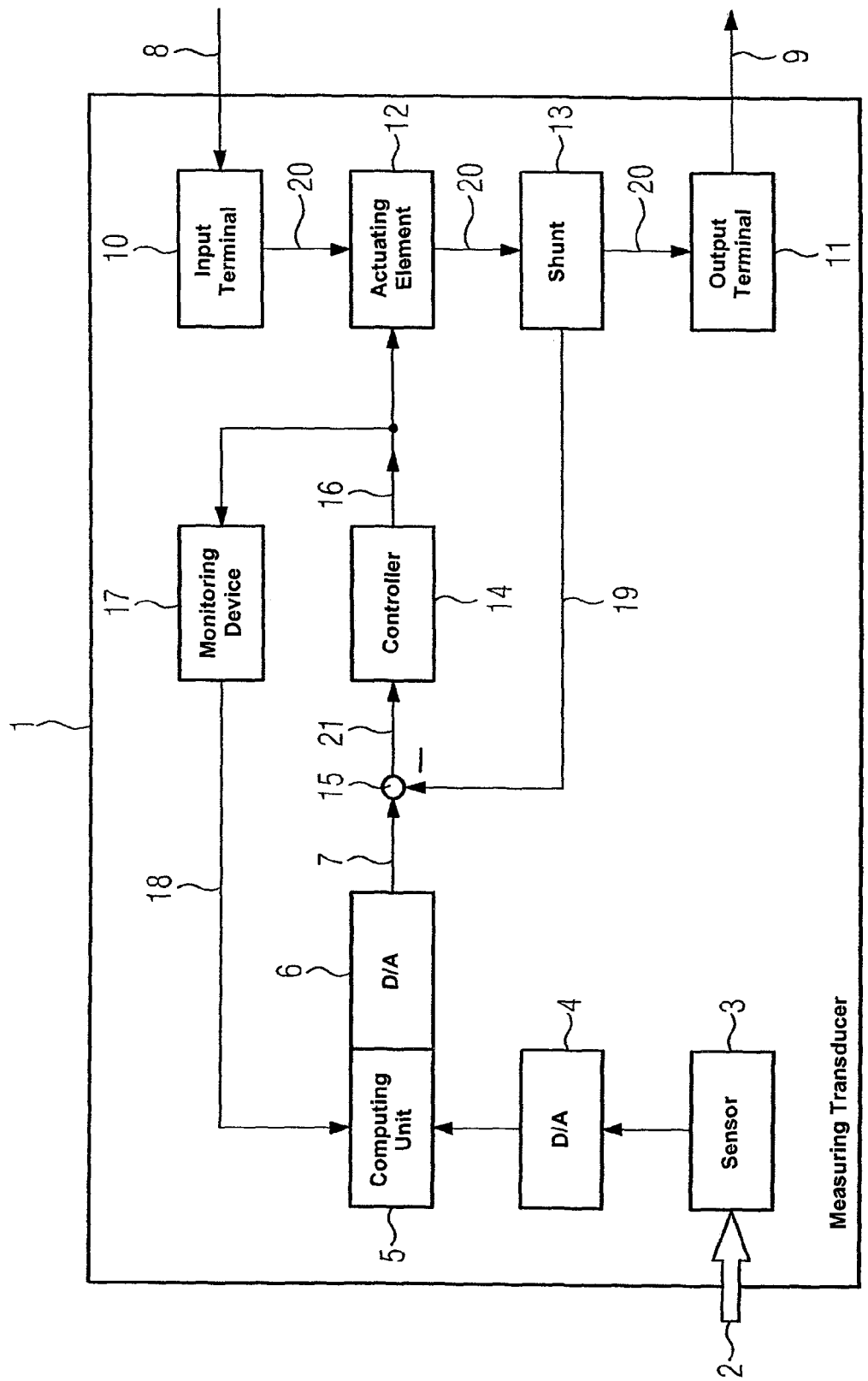

FIELD DEVICE FOR PROCESS INSTRUMENTATION

CROSS-REFERENCE TO RELATED APPLICATIONS

This is a U.S. national stage of International Application No. PCT/EP2008/067451, filed on 12 Dec. 2008. Priority is claimed on German Application No. 10 2007 059 847.7, filed on 12 Dec. 2007.

BACKGROUND OF THE INVENTION

1. Field of the Invention

The invention relates to a field device for process instrumentation and, more particularly, to a measuring transducer, comprising an analogue output, to which a two-wire line is connectable for transmitting an analogue output signal.

2. Description of the Related Art

Within the field of automation technology, field devices are frequently used for process instrumentation, which are used for instance to detect and/or influence process variables. The field devices are connected to one another by an automation network for the purpose of exchanging data. Field devices, which detect a physical or chemical variable as a process variable, are frequently referred to as measuring transducers, because they convert a relevant variable into a measured value and output this measured valve to a superior control station for instance or as an actual value to a controller for further processing. Examples of measuring transducers of this type are measuring transducers for fill level, mass flow rate, pressure, temperature, pH value, conductivity etc.

EP 1 192 614 B1 discloses a measuring transducer which converts a physical or chemical measured variable into an analogue output signal which corresponds to the measured value and which can be transmitted on a two-wire line. To this end, provision is made for a suitable sensor for the physical or chemical measured variable, an analogue/digital converter arranged downstream thereof, a computing unit arranged downstream thereof and an output circuit which is controllable by the computing unit and connectable to the two-wire line. Here, the sensor converts the measured variable into a sensor signal, which is digitalized in the analogue/digital converter and prepared in the computing unit to form a target value with which the analogue output signal is adjusted to the two-wire line by a control facility in the output circuit. The digital target value as a current default value is initially transformed into an analogue current target value in the output circuit using a digital/analogue converter and is converted into an analogue loop current by a subsequent control circuit. The actual value of the loop current is detected using a measuring element for the current/voltage conversion. Low-resistance current measuring resistors, such as shunts, can be used as simple measuring elements. The voltage signal thus generated, which is proportional to the actual value of the loop current, is fed to a comparison facility for forming a control deviation from the analogue current target value and the actual value of the loop current. With the aid of the control deviation, a controller, which is realized more clearly as an analogue controller with an integrated operational amplifier, in order to control the control deviation, determines an actuating signal for an actuating element, which is formed by a transistor circuit for adjusting the loop current. The measured analogue actual value of the loop current is simultaneously digitalized with the aid of an analogue/digital converter and fed to the computing unit as a digital actual value. The computing unit is therefore able to determine deviations between the digital actual value and the digital target value and to react thereupon as a result of a corresponding tracking of the target value. If impermissibly large deviations occur, this is communicated to the user of the field device. This can occur over a data interface and/or a display device for transmitting and/or displaying an item of information relating to the determined deviation and thus the measuring errors. The data interface is an integral part of the output circuit and enables data to be communicated by way of the two-wire line in accordance with the Highway Addressable Remote Transducer (HART) protocol.

SUMMARY OF THE INVENTION

It is an object of the present invention to provide a field device for process instrumentation comprising an analogue output, to which a two-wire line for transmitting an analogue output signal can be connected, where monitoring of a loop current and detection of an error function of a controller or an actuating element for the loop current is possible in a particularly simple manner.

This and other objects and advantages are achieved in a field device in accordance with the invention in which a particularly minimal effort in terms of circuit design is advantageously required for monitoring the controller and the actuating element for the loop current. The actuating signal is monitored in a particularly simple manner using a comparator to determine whether the actuation signal remains within a predeterminable value range, where the comparator continuously checks whether the actuating signal is located within a predeterminable signal range. The specifications of the signal range occur by taking the physical limits of the controller output signal and the respective circuit-specific realization of the actuating element into account. The actuating signal is advantageously directly and closely linked to the control deviation and is characteristic of the behavior of the controller of the loop current. With the aid of the indicator signal generated in this way, fault states can be rapidly and reliably signaled.

As an alternative to using a separate comparator for monitoring the actuating signal, it is naturally possible to guide the actuating signal via an analogue/digital converter, as a digitalized value, to the computing unit, which then takes over the monitoring to determine whether a predeterminable value range is maintained.

In a particular embodiment, the controller comprises a proportional-integral (PI) controller, which generates a proportional component and an integral component of the actuating variable as a function of the control deviation. When using a PI controller, the integral component results in an actuating signal proceeding similarly to a ramp function in an upper or lower limitation of the actuating signal in the event of a permanent control deviation. In an alternative embodiment in which an operational amplifier is used to provide the controller, these limits correspond approximately to the supply voltages of the operational amplifier. A permanent error function of the controller of the loop current can be reliably identified in this way.

In a further advantageous embodiment, a comparator is provided to generate the indicator signal, and the indicator signal can be led to the computing unit for further treatment of an error state. In the computing unit, a time-related evaluation of the indicator signal is thus enabled. As a result, in the case of sudden changes to the target value provided to the controller of the loop current, decaying of transient effects in the controller can be expected to avoid faulty diagnoses. Generally, the respective curve of the target value of the computing unit is known. Consequently, the type of monitoring can be selected by the computing unit as a function of the target value curve.

If an error in the controller or actuating element is determined by the computing unit as a result of monitoring the actuating signal, the computing unit immediately introduces suitable measures for fault elimination. For example, an error message or a message of a maintenance requirement can be output to a superior control station over the two-wire line and/or inclusion of a safety state of the field device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

On the basis of the drawing, in which an exemplary embodiment of the invention is shown, the invention, its embodiments and advantages are described in more detail below, in which:

The FIGURE is a schematic block diagram of a measuring transducer in accordance with an embodiment of the invention.

DETAILED DESCRIPTION OF THE PREFERRED EMBODIMENTS

The FIGURE shows the basic configuration of a measuring transducer 1, which is configured for use in an automation-specific system for detecting a chemical or physical variable. The chemical or physical variable 2 is fed to a sensor 3, which converts this variable into an electrical signal. The thus generated measuring signal is digitalized with an analogue/digital converter 4 and fed to a computing unit 5, in which the linearity and thermal behavior of the measuring signal is corrected. A digital default value of a loop current which corresponds to the measured value and is calculated by the computing unit 5 is converted into an analogue target value 7 of the loop current, with the aid of a downstream digital/analogue converter 6, and fed to a control loop for adjusting a loop current 20 in a two-wire line 8, 9, to which the measuring transducer 1 is connected. To connect the measuring transducer 1 to the two-wire line 8, 9, an input terminal 10 and/or an output terminal 11 are used. The loop current 20 flows through the input terminal 10, an actuating element 12, a shunt 13 to measure the loop current and the output terminal 11. The actuating element 12 can easily consist of a transistor, to which a control voltage is fed as an actuating signal 16 from a controller 14 comprising an operational amplifier. The shunt 13 is a precision resistor according to one embodiment.

The voltage drop 19 across the shunt 13, which is proportional to the loop current 20, is fed back to a comparison device 15 and is subtracted there from the target value 7 of the loop current to determine a control deviation 21. The controller 14 obtains the control deviation 21 as an input variable and calculates therefrom a proportional and integral component in accordance with its control parameters, which are preadjusted for instance with the aid of suitable sized resistors and capacitors in the circuitry of an operational amplifier. In the normal case, i.e., when the measured actual value 19 of the loop current 20 can be traced to its target value 7, the control deviation 21 disappears after the decay of possible transient effects and the actuating signal 16 at the output of the controller 14 remains within predetermined limits. If errors occur in the control facility, i.e., in the controller 14 or in the actuating element 12, in most cases this immediately results in the actuating signal 16 leaving a predetermined value range. This is determined with a device 17 for monitoring the actuating signal which, when leaving the predetermined value range, outputs an indicator signal 18 to display the error state to the computing unit 5. The thus detected error can be communicated by a suitable controller to an indicator unit of the measuring transducer 1, which is not shown in the FIGURE for reasons of clarity, to an operator or over the two-wire line 8, 9 to a superior control station in an automation-specific system. As a result, monitoring of components in the output circuit of the measuring transducer 1 is thus enabled way with comparatively little effort.

In the exemplary embodiment shown, a measuring transducer was described as a field device. Naturally, the contemplated embodiments of the invention can also be used with other field device types with analogue output, e.g., in actuating elements, such as control valves or in a controller which is programmable by memory with an analogue output module, which is suited for instance to connecting actuating elements by two-wire lines.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

The invention claimed is:

1. A field device for process instrumentation, comprising:
an analogue output to which a two-wire line is connectable for transmitting an analogue output signal;
a computing unit configured to output a digital value corresponding to the analogue output signal;
a digital/analogue converter arranged downstream of the computing unit for converting the digital value into an analogue target value of the analogue output signal;
a comparison device configured to form a control deviation from the analogue target value and an actual value of the analogue output signal measured at an output of the field device;
a controller receiving the control deviation from the comparison device and configured to calculate a proportional and integral component in accordance with control parameters and to generate an actuating signal for controlling the control deviation;
an actuating element configured to adjust the analogue output signal as a function of the generated actuating element;
a monitoring device configured to monitor whether the actuating signal remains within a predeterminable value range and to generate an indicator signal when the actuating signal is outside the value range, wherein the monitoring device comprises a comparator configured to generate the indicator signal, wherein the indicator signal is supplied to the computing unit for further treatment of an error state identified when the value range is exceeded; and a shunt operatively coupled to the actuating element and the two wire connection, a loop current flowing through an input of the device, the actuating element and the shunt to measure the loop current.

2. The field device as claimed in claim 1, wherein the controller is a proportional-integral (PI) controller.

3. The field device as claimed in claim 1, wherein the field device is a measuring transducer.

\* \* \* \* \*